3,509,223
ACID-CATALYZED TRANSFORMATION OF
CYCLOHEXANE INTO DIMETHYLDECALINS
Ronald D. Bushick, Glen Mills, and George Suld, Springfield, Pa., assignors to Sun Oil Company, Philadelphia, Pa., a corporation of New Jersey
No Drawing. Filed June 13, 1968, Ser. No. 736,598
Int. Cl. C07c 13/00
U.S. Cl. 260—666                                3 Claims

ABSTRACT OF THE DISCLOSURE

A method for preparing dimethyldecalins wherein a $C_6$ naphthene hydrocarbon feed is contacted with a $HF\text{-}BF_3$ catalyst system at a temperature in the range of $-20°$ C. to $80°$ C.

---

This invention relates to the preparation of dimethyldecalin by the catalytic dimerization of $C_6$ naphthenes. More particularly, the invention relates to the preparation of 2,6-dimethyldecalin and its subsequent conversion into 2,6-dimethylnaphthalene.

Dimethyldecalins (dimethyldecahydronaphthalenes) are useful intermediates for the preparation of various intermediates containing functional groups. Particularly, dimethyldecalins can be dehydrogenated forming dimethylnaphthalene which can be oxidized under controlled conditions as exemplified by Saffer et al. in United States Patent No. 2,833,816 to form the corresponding to dicarboxylic acid. Naphthalene dicarboxylic acid in which the carboxyl groups are located at the 2,6 positions is a highly desirable article of commerce, particularly in that it can be used for making polyester-type resins which have outstanding properties in various applications.

For commercial practice, a difficulty in producing 2,6-naphthalene dicarboxylic acid lies in finding a suitable source of the 2,6-dimethylnaphthalene isomer. This compound occurs in coal tar and cracked petroleum fractions of appropriate boiling range but only in low proportion since it is associated with the various other dimethylnaphthalene isomers, monocyclic aromatics, and nonaromatic hydrocarbons. A concentrate of the dimethylnaphthalene isomers can be obtained by solvent extraction of the fraction with an aromatic-selective solvent such as furfural, but the 2,6-isomer is still only a minor constituent of the concentrate.

Recently, as described by Schneider in United States Patent Nos. 3,219,718, 3,219,719, and 3,243,469, it has been discovered that decahydronaphthalenes can be prepared by the isomerization of dicyclic naphthenes having two cyclic rings utilizing an aluminum halide-hydrogen halide catalyst. Preferably, the catalyst is a liquid complex obtained by reacting the aluminum halide and hydrogen halide catalyst in the presence of a paraffin hydrocarbon. Various dicyclic naphthenes having 11 to 20 carbon atoms when reacted in the presence of the aforesaid catalyst at a temperature in the range of $-20°$ C. to $80°$ C. will rearrange to form decahydronaphthalenes having the same empirical formula as the dicyclic naphthene charged. It should be noted that in Patent No. 3,219,719 Schneider discloses the essential equivalency of a HCl-$AlCl_3$ catalyst with a $HF\text{-}BF_3$ catalyst for the isomerization of dicyclic naphthenes having 11 carbon atoms.

The most recent patent and the reference most directly in point with the instant invention is Schneider's United States Patent No. 3,346,656. Here, the patentee discloses the preparation of dimethyldecalins by the catalytic dimerization of $C_6$ naphthenes while employing liquid complex catalysts of $AlCl_3\text{-}HCl$ or $AlBr_3\text{-}HBr$. In carrying out this process, however, the patentee only receives a maximum conversion of 12.4% by weight of his reactant to the desired dimethyldecalin.

It has now been discovered that an unexpected and improved conversion of the $C_6$ naphthenes can be obtained by carrying out the reaction in the presence of a $HF\text{-}BF_3$ catalyst system in the presence of a suitable hydrogen acceptor. The greater effectiveness of the catalyst system for a $C_6$ naphthene dimerization can be seen by the ability of the reaction to achieve yields of approximately 40% by weight based on the $C_6$ naphthene charged.

In accordance with this invention, a $C_6$ naphthene or a mixture of such naphthenes is contacted at a temperature in the range of $-20°$ C. to $80°$ C. preferably $10°$ to $75°$ C., with a catalyst system comprising a hydride acceptor-initiator, HF, and $BF_3$. Under these conditions, the naphthene dimerizes to form a $C_{12}$ naphthene which isomerizes to an equilibrium mixture of dimethyldecalins. The equilibrium mixture contains approximately 30% each of 2,6- and 2,7-dimethyldecalins. The reaction involves the abstraction of a hydrogen ion from each $C_6$ naphthene molecule.

Any $C_6$ naphthene is suitable for use as a charge stock in the invention. Examples are cyclohexane, methylcyclopentane, dimethylcyclobutane, ethylcyclobutane, and mixtures thereof, while the preferable charge is cyclohexane. As stated supra, approximately 40% by weight of the charge stock is converted to dimethyldecalin; the remaining material consists of minor amounts of impurities and paraffins and the remainder an equilibrium mixture of $C_6$ naphthenes. The remaining naphthenes can be submitted again to the reaction and converted to dimethyldecalins.

The catalyst system employed for the dimerization consists of hydrogen fluoride, boron trifluoride, and a hydride acceptor-chain initiator. The hydried acceptor-initiator is an organic compound containing less than six carbon atoms, which is generally an olefin or an alkylhalide, although alcohols and ethers are also functional. Examples of such organic compounds are propylene, isobutylene, pentenes, ethanol, 1-propanol, dimethylether, methylisopropylether, 1-chloropropane, dichloropentane, and the like. Preferably, the acceptor is propylene.

The amount of hydride acceptor-initiator used generally should be 0.3 to 0.7 mole per mole of the $C_6$ naphthene charge, and preferably 0.5 mole per mole of charge. These amounts are based on stoichiometric considerations since the compound, for example, propylene, is functioning not only as a chain initiator but also as a hydride acceptor, i.e., being hydrogenated in the course of the reaction. Hence, when the naphthene charge is converted to the carbonium ion, the hydride ions liberated will be accepted by the initiator-acceptor. The HF and $BF_3$ each may be used in amounts as low as one mole per mole of hydride acceptor-initiator, but the dimerization rate is maximized by using an excess of each. To insure an excess of $BF_3$, the reaction system preferably is maintained under a $BF_3$ partial pressure of 50 to 200 p.s.i.

It has been stated above that the instant invention is to be conducted at a temperature in the range of from about $-20°$ to about $80°$ C., preferably from about $10°$ to $75°$ C. It is important to the success of the instant invention that the reaction temperature no be allowed to exceed about $80°$ C. If this temperature is exceeded, the naphthene is cracked to light hydrocarbons and an olefin which deactivates the catalyst complex. The reaction is generally carried out for a period of from one to six hours.

In order that those skilled in the art may fully comprehend the nature of the invention and its mode of operation, the following nonlimiting examples are presented.

EXAMPLE I

One-tenth mole of cyclohexane was charged to a 75 ml. Hoke pressure vessel. The vessel and its contents were submerged in a Dry-Ice-acetone bath and evacuated; and 22.0 cc. of HF was then added, followed by 2.2 g. of propylene, the olefin initiator. Subsequently, 1.0 g. of $BF_3$ was added, and the reaction time was measured from this point. The 70° C. reaction temperature was controlled by immersing the vessel in a thermostated oil bath. The reaction was run for six hours after which the vessel and its contents were cooled in ice for 20 to 25 minutes. Thereafter, the contents were carefully withdrawn into a polyethylene beaker containing crushed ice. The organic layer was separated, neutralized, washed, dried, and finally analyzed by vapor phase chromatography. The results are found in Table I.

Table I

| Product composition: | Weight percent |
|---|---|
| Cyclohexane | 24.7 |
| Methylcyclopentane | 4.1 |
| Dimethyldecalin | 48.2 |
| $C_9$'s | 12.3 |
| Others | 10.7 |

EXAMPLE II

The same procedure as set forth in Example I was employed; however, the charge consisted of 0.1 mole cyclohexane, 20.4 g. HF, 3.3 g. $BF_3$, and 3.4 g. propylene. The reaction was carried out at 70° C. for three hours. The results are shown in Table II.

Table II

| Product composition: | Weight percent |
|---|---|
| Cyclohexane | 13.7 |
| Methylcyclopentane | 1.7 |
| Dimethyldecalin | 41.8 |
| $C_9$'s | 21.4 |
| Others | 21.4 |

EXAMPLE III

The same procedure as set forth in Example I was employed; however, the charge consisted of 0.1 mole cyclohexane, 21.0 g. HF, 3.0 g. $BF_3$, and 2.2 g. propylene. The reaction was carried out at 70° C. for four hours. The results are shown in Table III.

Table III

| Product composition: | Weight percent |
|---|---|
| Cyclohexane | 37.1 |
| Methylcyclopentane | 6.2 |
| Dimethyldecalin | 40.5 |
| $C_9$'s | 13.5 |
| Others | 2.7 |

The dimethyldecalins formed contained approximately 30% by weight 2,6-dimethyldecalin. The 2,6-dimethyldecalin can be selectively crystallized and subsequently dehyrogenated to form 2,6-dimethylnaphthalene, employing the method as described by Schneider in United States Patent No. 3,243,469. As aforementioned, this 2,6-dimethylnaphthalene can be converted easily to the highly desirable dicarboxylic acid.

EXAMPLE IV

This example was carried out following the procedure as set forth in Example I; however, the charge stock here was 0.125 mole methylcyclopentane, 21.7 cc. HF, 3.7 g. $BF_3$, and 2.7 g. propylene. The results are shown in Table IV.

Table IV

| Product composition: | Weight percent |
|---|---|
| Cyclohexane | 37.0 |
| Methylcyclopentane | 6.4 |
| Dimethyldecalin | 33.0 |
| $C_9$'s | 12.5 |
| Others | 11.1 |

While the particular methods of application described herein are well adapted to meet the objects of the present invention, various modifications or changes may be resorted to without departing from the scope of the invention as defined in the claims.

We claim:
1. A method for preparing dimethyldecalin which comprises contacting a $C_6$ naphthene hydrocarbon feed at a temperature in the range of −20° to 80° C. with a catalyst system consisting of an organic hydride acceptor-initiator having less than six carbon atoms, HF, and $BF_3$.
2. A method according to claim 1 wherein the temperature is in the range of 10° to 75° C.
3. A method according to claim 1 wherein the hydride acceptor-initiator is propylene.

References Cited

UNITED STATES PATENTS

| 3,078,319 | 2/1963 | Wood. |
| 3,151,174 | 9/1964 | Wood et al. |
| 3,152,192 | 10/1964 | Wood et al. |
| 3,346,656 | 10/1967 | Schneider. |
| 2,723,298 | 11/1955 | Schneider. |

DELBERT E. GANTZ, Primary Examiner

V. O'KEEFE, Assistant Examiner